350-339 SR
11/24/87 XR 4,708,914

United States Patent [19]

Kamijo

[11] Patent Number: 4,708,914

[45] Date of Patent: Nov. 24, 1987

[54] TRANSPARENT ELECTRODE SHEET

[75] Inventor: Yoshimi Kamijo, Furukawa, Japan

[73] Assignee: Alps Electric Co., Ltd., Japan

[21] Appl. No.: 760,299

[22] Filed: Jul. 29, 1985

[30] Foreign Application Priority Data

Jul. 28, 1984 [JP] Japan ........................... 59-115596[U]

[51] Int. Cl.⁴ ........................... B32B 9/00; G02F 1/13; H01J 1/62

[52] U.S. Cl. ..................................... 428/690; 428/917; 350/339 D; 350/339 F; 350/339 R; 204/192.29; 313/500; 313/503; 313/505; 313/506; 313/509; 313/511

[58] Field of Search ........... 350/339 D, 339 F, 339 R; 340/781, 794; 204/192 P; 428/1, 201, 332, 690, 691, 917; 313/500, 503, 505, 506, 509, 511

[56] References Cited

U.S. PATENT DOCUMENTS

| | | | |
|---|---|---|---|
| 3,252,845 | 5/1966 | Schindler et al. | 156/67 |
| 4,227,039 | 10/1980 | Shibasaki et al. | 174/68.5 |
| 4,326,007 | 4/1982 | Williams et al. | 428/333 |
| 4,370,028 | 1/1983 | Bernhardt | 350/341 |
| 4,416,933 | 11/1983 | Artson et al. | 428/216 |
| 4,443,832 | 4/1984 | Kanamori et al. | 362/84 |
| 4,556,288 | 12/1985 | Sekimura | 350/339 R |
| 4,560,240 | 12/1985 | Sekimura | 350/336 |
| 4,593,228 | 6/1986 | Albrechtson et al. | 313/509 |

FOREIGN PATENT DOCUMENTS

| | | | |
|---|---|---|---|
| 0028198 | 6/1982 | Japan | 313/500 |

*Primary Examiner*—John E. Kittle
*Assistant Examiner*—Patrick J. Ryan
*Attorney, Agent, or Firm*—Guy W. Shoup

[57] ABSTRACT

Disclosed is a transparent electrode sheet and method of producing therefor, in which a transparent electrode is formed on a transparent plastic film and a protection coating is further formed on the transparent electrode.

11 Claims, 3 Drawing Figures

TRANSPARENT ELECTRODE SHEET

BACKGROUND OF THE INVENTION

1. Field of the Invention

The present invention relates to transparent electrode sheets for use to produce accumulated electroluminescence elements, or like, and a method of producing therefor.

2. Description of the Prior Art

A transparent electrode sheet in which a transparent electrode of indium oxide group, or the like, is formed on a transparent polyester film, of the like, is available on the market. Such a transparent electrode sheet is used, for instance, to produce an accumulated electroluminescence element (hereinafter referred to as ACELD), or the like.

FIG. 1 shows one example of ACLED using this transparent electrode sheet. That is, a phosphor layer 14 is formed by applying a mixture of cyano ethyl cellulose and ZnS sulfide group fluorescent powder onto a transparent electrode sheet 11 which is made by forming an indium oxide group transparent electrode 13 on a transparent polyester film 12, a dielectric layer 15 is formed by applying a mixture of cyano ethyl cellulose and $TiO_2$ powder onto the phosphor layer 14, and an opposite electrode 16 of an aluminum foil, or the like, is further formed on the dielectric layer 15, thereby constituting an integral assembly, ACELD. In the thus formed ACELD, the phosphor layer 14 is caused to emit light by applying an AC voltage between the transparent electrode 13 and the opposite electrode 16.

In the case of using the above-mentioned transparent electrode sheet 11, however, in the step of forming the transparent electrode 13 on the polyester film 12 and/or in the process of transporting the transparent electrode sheet 11, the transparent electrode 13 may be easily injured due to dust attached thereto or by being rubbed, and, therefore, when ACELD is produced by using the such a transparent electrode sheet 11, it is apt to cause fault phenomena such as light emission stop, irregular light emission, partial light emission, or the like, resulting in reduction in yield.

SUMMARY OF THE INVENTION

Accordingly, it is an object of the present invention to provide a transparent electrode in which the transparent electrode is prevented from being injured due to dust mixed therewith, by being rubbed in handling, etc.

According to one aspect of the present invention, the transparent electrode sheet comprises a transparent electrode formed on a transparent plastic film, and a protection coating further formed thereon.

According to another aspect of the present invention, the method of producing a transparent electrode sheet comprises the steps of forming a transparent electrode on a plastic transparent film and forming a protection coating on the transparent electrode.

Accordingly, in a producing or transporting process, being protected by the protection coating, the transparent electrode is hardly injured even if the electrode is mixed with dust or rubbed in the step of production or in the process of transportation, and when ACELD or the like is produced by this transparent electrode sheet, it is possible to reduce the occurrence of faulty products.

DETAILED DESCRIPTION OF PREFERRED EMBODIMENT

Figure 1:
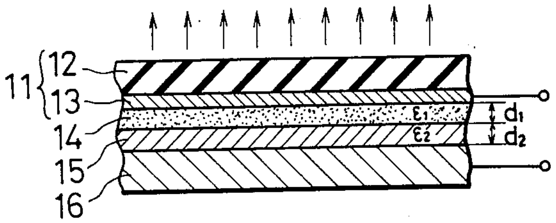
Fig.1 PRIOR ART
FIG. 1 is a sectional view showing an accumulated electroluminescence element produced by using a conventional transparent electrode sheet.

Referring to the drawings, a preferred embodiment of the present invention will be described, hereunder.

Figure 2:
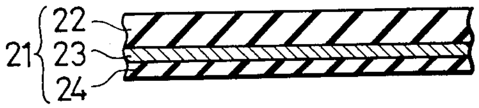
FIG. 2 is a sectional view showing a basic arrangement of a transparent electrode sheet according to the present invention; and FIG .3 is a sectional view showing an accumulated electroluminescence elements produced by using a transparent electrode sheet according to the present invention.

FIG. 2 shows a basic arrangement of the transparent electrode sheet according to the present invention. That is, a transparent electrode sheet 21 is constituted by a transparent plastic film 22 formed on a transparent electrode 23 and a protection coating 24 further formed thereon.

In this case, a plastic film made of polyester, or the like, may be used as the transparent plastic film 22. The transparent electrode 23 is formed by coating the film 22 with an electrically conductive material such as indium oxide, tin oxide, or the like, by vacuum evaporation, sputtering, or the like, or by applying paste containing such an electrically conductive material as described above to the film 22 and sintering the same. The protection coating 24 is formed by coating the electrode 23 with, for instance, a resin material having a superior dielectric strength property by vacuum evaporation or application. Since the transparent plastic film 22 is flexible, it is preferable to form the protection coating 24 with such a soft material as resin, for instance, polyvinylidene fluoride, vinylidene fluoride - 6 propylene fluoride copolymer, cyano ethyl cellulose, or the like. Because of a reason as will be described later, the protection coating 24 is desirable to have a specific inductive capacity equal to or larger than 6 at 1 KHz and a thickness equal to or smaller than 20 $\mu$m.

Figure 3:
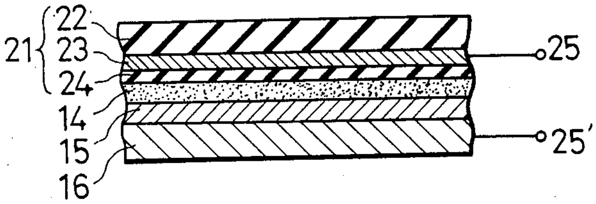

FIG. 3 shows an example of ACELD produced by using the transparent electrode sheet 21 according to the present invention. That is, a phosphor layer 14 is formed on the protection coating 24 of the transparent electrode sheet 21, a dielectric layer 15 is formed thereon, and an opposite electrode 16 is further formed thereon. The phosphor layer 14 may be formed by applying, by means of, for example, such as screen printing, fluorescent powder of a fluorescent material such as ZnS, or the like, doped with an activator such as copper, manganese, or the like, and an inactivator such as chloride, or the like, by using cyano ethyl cellulose as a binder, or alternatively, may be formed by vacuum evaporation or sputtering with a fluorescent material such as zinc sulfide. The dielectric layer 15 may be formed by vacuum evaporation or spattering with metal oxide such as indium oxide or a metal material such as aluminum, silver, copper, or the like, or by applying paste containing those metal oxides or metal material as mentioned above by means of screen printing and then sintering the same. Further, the layer 15 may be formed by bonding an aluminum foil, or the like. Then, terminals 25 and 25' are formed so as to be electrically connected to the transparent electrode 23 and the opposite electrode 16 respectively.

In the ACELD shown in FIG. 1, the luminance B can be expressed by the following equations.

$$B = a\ exp(-b/v^{\frac{1}{2}}) \quad (1)$$

$$V = E(d_1 + 0.089\ \epsilon_1/Cs) \quad (2)$$

where B represents luminance, V an applied AC voltage, each of a and b a constant; E a voltage applied to the phosphor layer, $d_1$ a thickness of the phosphor layer, $\epsilon_1$ a specific inductive capacity of the phosphor layer, and Cs a sheet capacity of the dielectric layer.

In order to obtain excellent luminance B according to the equations (1) and (2), it is necessary to enlarge the voltage V. In order to efficiently apply voltage E to the phosphor layer 14 at a certain voltage V, it is necessary to reduce the thickness $d_1$ of the phosphor layer 14 and besides to enlarge the sheet capacity Cs of the dielectric layer 15. In order to enlarge Cs, it is required to enlarge the specific inductive capacity $\epsilon_2$ of the dielectric layer 15 and to reduce the thickness $d_2$ of the dielectric layer 15.

In the ACELD of FIG. 3 using the transparent electrode sheet 21 according to the present invention, the protection coating 24 achieves the same action as the dielectric layer 15. Accordingly, as mentioned above, it is desirable that the protection coating 24 has a specific inductive capacity equal to or larger than 6 at 1 KHz and a thickness equal to or smaller than 20 μm.

In the ACELD of FIG. 3, if the protection coating 24 can efficiently tolerate a driving voltage, the dielectric layer 15 can be omitted. Alternatively, the dielectric 15 may be be omitted with the driving voltage limited within a range to which the protection coating 24 can tolerate.

EMBODIMENT 1

A transparent electrode sheet 21 was produced in a manner such that a transparent electrode 23 of indium oxide group was formed on a transparent plastic film 22 of polyester and a protection coating 24 of a thickness of 5000 Å was formed thereon by vacuum evaporating polyvinylidene fluoride (abbreviated as PVDF and having a specific inductive capacity of about 8 at 1 KHz) at $10^{-4}$–$10^{-5}$ Torr.

An ACELD was produced by using this transparent electrode 21. That is, a phosphor layer 14 was formed, by screen printing, with paste composed of ZnS—Cu powder and cyano ethytl cellulose on the protection coating 24 of the transparent electrode 21, a dielectric layer 15 was formed, by screen printing, with paste composed of $TiO_2$ powder and cyano ethyl cellulose thereon, and an opposite electrode 16 was further formed theron by bonding an aluminum foil. The thus obtained ACELD showed luminance of 10–15 cd/$m^2$ at 100 V and 50 Hz. This luminance is equal to that of the ACELD of FIG. 1 produced by using a conventional transparent electrode sheet.

EMBODIMENT 2

A transparent electrode sheet 21 was produced in a manner such that a transparent electrode 23 of indium oxide group was formed on a transparent plastic film 22 of polyester and a protection coating 24 of a thickness of 1 to 2 μm was formed theron by applying vinylidene fluoride-propylene copolymer (with specific inductive capacity of about 7 at at 1 KHz) after diluted by ethyl acetate.

By using the transparent electrode sheet 21, ACELD was produced in the same manner as EMBODIMENT 1. The thus obtained ACELD showed the same luminance as EMBODIMENT 1.

EMBODIMENT 3

A transparent electrode sheet 21 was produced in a manner such that a transparent electrode 23 of indium oxide group was formed on a transparent plastic film 22 of polyester and a protection coating 24 of a thickness of 1 to 2 μm was formed theron by applying cyano ethyl cellulose (with specific inductive capacity of about 12 at 1 KHz) after diluted by acetone.

By using the transparent electrode sheet 21, ACELD was produced in the same manner as EMBODIMENT 1. The thus OBTAINED ACELD showed the same luminance as EMBODIMENT 1.

EMBODIMENT 4

A transparent electrode sheet 21 was produced in a manner such that a transparent electrode 23 of indium oxide group was formed on a transparent plastic film 22 of polyester and a protection coating 24 was formed thereon by laminating a damp-proof cellophane sheet of a thickness of 20 μm (with specific inductive capacity of about 6 at at 1 KHz) through a bonding agent.

By using the transparent electrode sheet 21, ACELD was produced in the same manner as EMBODIMENT 1. The thus obtained ACELD showed the same luminance as EMBODIMENT 1.

According to the present invention, as described above, since a transparent electrode is formed on a transparent plastic film and a protection coating is further formed thereon, it is possible to prevent damage from occurring in the transparent electrode in the steps of producing and/or in the process of transporting the the transparent electrode sheet, in the process of producing the ACELD, etc., so that it becomes easy to handle a transparent electrode sheet. In the ACELD produced by using the transparent electrode sheet, it is possible to obtain the same luminance as the ACELD produced by a conventional transparent electrode sheet.

What is claimed is:

1. In an accumulated electroluminescence display element (ACELD) of the type comprising a laminate of a transparent electrode sheet, which is composed of a first transparent film layer formed over a transparent electrode layer, a phosphor layer disposed below said transparent electrode sheet, a dielectric layer disposed below said phosphor layer, and a lower electrode layer disposed below said dielectric layer, wherein said phosphor layer is caused to emit light by a voltage applied between said transparent electrode layer and said lower electrode layer, the improvement wherein said transparent electrode sheet is further composed of a second transparent plastic film layer formed below said transparent electrode layer as both a protection coating and as a dielectric layer having a specific inductive capacity equal to or larger than 6 at 1 KHz and a thickness equal to or less than 20 μm, whereby a composite transparent electrode sheet is provided with said transparent electrode layer sandwiched in contact between said first and second transparent film layers.

2. An ACELD element according to claim 1, in which said transparent film layer is made of a transparent plastic material such as polyester, and said transparent electrode is made of a material of indium oxide group.

3. An ACELD element according to claim 1, wherein said second transparent film layer is formed of a resin material selected from the group consisting of polyvinylidene fluoride, vinylidene fluoride-propylene copolymer, cyano ethyl cellulose, and cellophane.

4. In a method of producing an accumulated electroluminescence display element (ACELD) of the type comprising a laminate of a transparent electrode sheet, which is composed of a first transparent film layer formed over a transparent electrode layer, a phosphor layer disposed below said transparent electrode sheet, a dielectric layer disposed below said phosphor layer, and a lower electrode layer disposed below said dielectric layer, wherein said phosphor layer is caused to emit light by a voltage applied between said transparent electrode layer and said lower electrode layer, the improvement comprising the step of first forming said transparent electrode sheet protected by said first transparent film layer and by a second transparent plastic film layer formed below said transparent electrode layer as a protection coating, whereby a composite transparent electrode sheet is provided with said transparent electrode layer sandwiched in contact between said first and second transparent film layer in order to prevent damage to said transparent electrode layer during handling in the subsequent fabrication steps of forming said phosphor, dielectric, and lower electrode layers.

5. A method of producing an ACELD element according to claim 4, in which said transparent film layer is made of a transparent plastic material such as polyester, and said transparent electrode is made of a material of indium oxide group.

6. A method of producing an ACELD element according to claim 4, in which said protection coating is formed on said transparent electrode by vacuum evaporating polyvinylidene fluoride.

7. A method of producing an ACELD element according to claim 4, in which said protection coating is formed on said transparent electrode by applying vinylidene fluoridepropylene copolymer after diluted by ethyl acetate.

8. A method of producing an ACELD element according to claim 4, in which said protection coating is formed on said transparent electrode by applying cyano ethyl cellulose after diluted by acetone.

9. A method of producing an ACELD element according to claim 4, in which said protection coating is formed on said transparent electrode by laminating a damp-proof cellophane sheet through a bonding agent.

10. A method of producing an ACELD element according to claim 4, wherein said protection coating is formed as a thin layer by vacuum evaporation or sputtering.

11. A method of producing an ACELD element according to claim 4, wherein said protection coating is formed as a dielectric layer having a specific inductive capacity equal to or larger than 6 at 1 KHz and a thickness of equal to or smaller than 20 $\mu$m.

* * * * *